April 29, 1941.　　　C. E. MASON　　　2,240,243
CONTROL MECHANISM
Filed Dec. 3, 1937　　　4 Sheets-Sheet 1
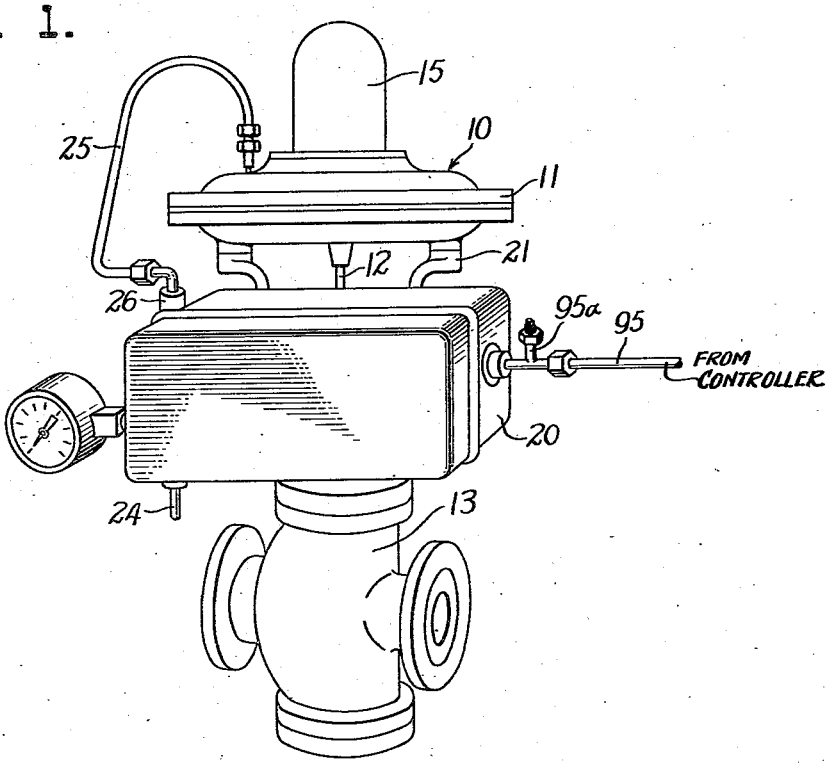
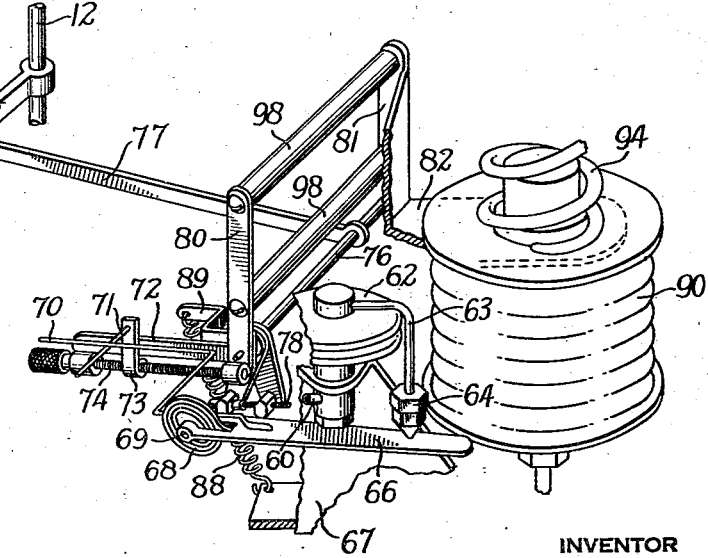
INVENTOR
Clesson E. Mason
BY
Blair, Curtis, Dunne & Hayward
ATTORNEYS

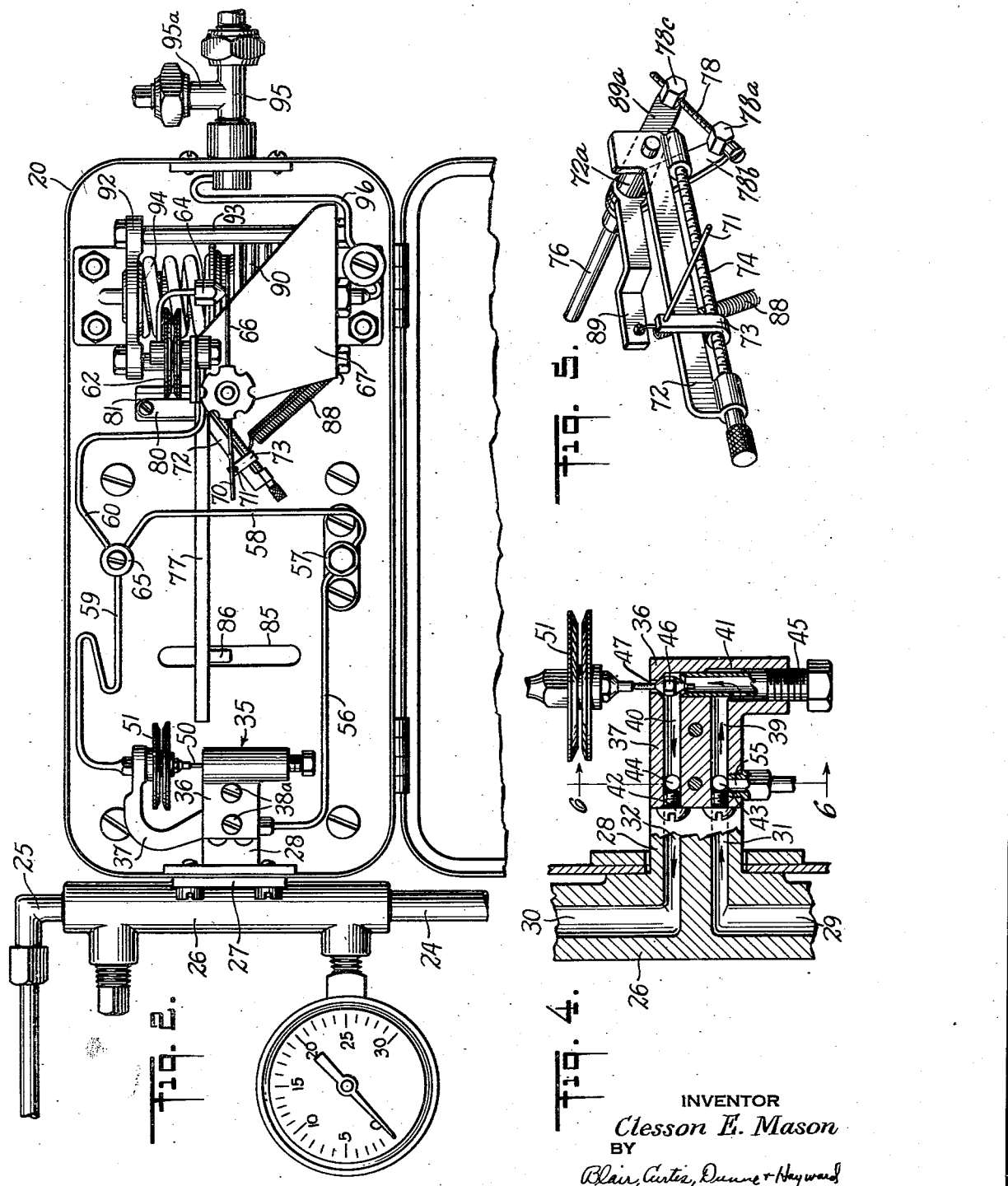

April 29, 1941.  C. E. MASON  2,240,243
CONTROL MECHANISM
Filed Dec. 3, 1937  4 Sheets-Sheet 3

INVENTOR
Clesson E. Mason
BY
Blair, Curtis, Dunne & Hayward
ATTORNEYS

April 29, 1941.   C. E. MASON   2,240,243
CONTROL MECHANISM
Filed Dec. 3, 1937   4 Sheets-Sheet 4

INVENTOR
Clesson E. Mason
BY
Blair, Curtis, Dunner & Hayward
ATTORNEYS

Patented Apr. 29, 1941

2,240,243

UNITED STATES PATENT OFFICE 2,240,243

CONTROL MECHANISM

Clesson E. Mason, Foxboro, Mass., assignor to The Foxboro Company, Foxboro, Mass., a corporation of Massachusetts Application December 3, 1937, Serial No. 177,933

11 Claims. (Cl. 121—41)

This invention relates to improvements in control mechanisms and more particularly to a mechanism for insuring accurate translation of position into pressure, or pressure into position, as in the positioning of a movable element such as a valve in the desired correspondence with a control force, under adverse conditions of friction and like mechanical factors working in opposition to the element moving to the exact position corresponding to the control force.

The present invention is directed broadly to an improved and simplified mechanism for translating the position of an element into a pressure, or for positioning an element responsively to a predetermined control force, in which the position of the element is utilized jointly with the control force to exercise control effects on the motive means for actuating the element in such manner that the value or values of the force exerted by the motive means on the element is always such as may be necessary to position the element accurately in the desired correspondence with the particular control force value.

The invention further contemplates, in a mechanism of the character outlined, a novel and improved means of correlating element position with a particular control force value according to a fixed relationship, whereby movement of the element to a position exactly corresponding to the control force value according to the relationship is assured.

A further object of the invention is the provision of control mechanism of the stated character which utilizes improved means by which a frictionless setting of the correlating means in accordance with a control force value is obtained, thus to insure a true positioning of the means responsively to each particular control force value within the operative range of the mechanism.

A further object of the invention is the provision of a control mechanism as described which may be readily applied as a unit to the element and motive means assembly, regardless of whether or not the assembly is a part of an existing system.

Other objects will be in part obvious and in part hereinafter pointed out in connection with the following analysis of this invention wherein is illustrated an embodiment of the invention in detail.

In the drawings:

Figure 1 is a perspective view illustrating the control mechanism of the present invention combined with a motor and valve assembly which it controls;

Figure 2 is a view looking into the housing of the control mechanism illustrated in Figure 1;

Figure 3 is a perspective view of parts of the control mechanism;

Figures 4 and 5 are enlarged views illustrating details of the control mechanism;

Figure 6:
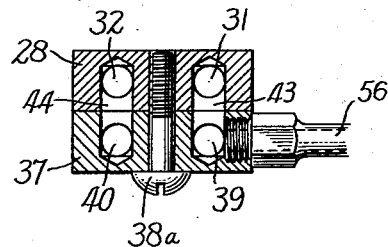
Figure 6 is a section taken on line 6—6 through Figure 4.

In the drawings wherein like reference characters designate like parts throughout the several views, 10 designates generally a valve and motor assembly including a diaphragm motor 11 for actuating in one direction the stem 12 of a valve contained in the valve body 13 against the force of a spring mounted above the diaphragm of the motor and covered by a cap 15 secured to the top of the motor casing. It will be understood that the motor and valve assembly is of standard construction, with the stem 12 and valve carried thereby being representative of an element to be positioned by the mechanism of the present invention.

Secured to the motor and valve assembly is a housing 20 of generally box-like construction which carries on its rear wall mounting brackets (not shown) by which the housing may be secured to the motor frame or yoke 21. Within the housing is contained the control mechanism of the present invention, the arrangement being such that the housing and the control mechanism parts may be mounted as a unit on the motor and valve assembly, even though installed in an existing system.

Pressure air for actuating the diaphragm motor is supplied through lines 24 and 25 and the intermediate fitting 26 having securing flanges 27 whereby the fitting may be bolted or otherwise secured to an outer face of a sidewall of the housing 20. Intermediate its ends the fitting 26 is provided with a lateral lug or projection 28 which extends into the housing through a suitable opening in the side wall. Referring to Figures 4 and 6, the fitting proper is provided with aligned passages 29 and 30 communicating respectively with spaced lateral bores 31, 32, formed in the lug 28, the ends of the bores being plugged as by screws, not shown.

One face of the lug 28 is formed flat to provide a mounting surface for the valve body of a control head of known construction, generally indicated at 35, the valve body including a longitudinally bored barrel portion 36, an offset plate portion 37, and an arm portion 38. The plate portion 37, which is secured to the lug 28 as by cap screws 38a is provided with spaced bores 39, 40 communicating at one end with the bore 41 of the barrel portion 36, their other ends being closed by plugs 42. Bores 39, 40 respectively overlie bores 31, 32 of the fitting lug, and are connected by the cross bores 43, 44.

Hence air from the supply line 24 enters passage 29 of the fitting and bore 31 of the fitting lug, thence passes into bores 39 and 41 of the valve body, thence passes out through bore 40 and cross bore 44 into bore 32 of the fitting lug, and out through the fitting passage 30 and thence through line 25 to the motor.

Into one end of the bore 41 of the barrel portion 36 of the valve body is threaded a plug screw 45 having an unthreaded tubular end portion terminating short of the other end of the bore. Air from the supply air bore 39 may pass into the tubular end of the plug screw, its passage therefrom to bore 40 being under the control of one side of a double valve 46, the other side of which controls the waste port 47 to atmosphere. Accordingly the valve body 35 and its associated valve 46 provides a control head of the supply and waste type, which controls the supply of pressure air to the motor by controlling communication between the supply passages 39, 40, and the release of pressure air from the motor.

Valve 46 is carried by a stem 50 which is threaded so that the position of the valve thereon may be adjusted as desired, the stem 50 being in turn carried by the double diaphragm unit 51, the condition of distension or collapse of which determines the position of valve 46. The diaphragm is carried by arm portion 38 and it may distend in the direction of the adjacent end of the barrel portion 36 of the control head.

Pressure air from line 29 is also supplied to a nipple 55 threaded into the plate portion 37 of the valve body to communicate with air passage 39. Connected to the nipple is an air tube 56 which, through a restriction 57 secured to the inner face of the rear wall of the housing 20, delivers to an air tube 58, which branches at coupling stud 65 into two air tubes 59 and 60, of which tube 59 is connected with the interior of the diaphragm unit 51. Tube 60 is connected with a nozzle 64 leading to atmosphere and supported from diaphragm unit 62 by tube 63, the diaphragm unit 62 being supported from a fixed bracket 67. The nozzle is one element of a control couple of the nozzle and flapper type.

The associated flapper 66 of the couple is pivotally carried at one end by the fixed bracket 67 and is so biased by a light spring 68 such as a hair spring related to its pivot 69 that its outer free end tends to approach the nozzle 64, thus to obstruct the escape of air through the nozzle.

The pivoted end of the flapper 66 carries a rearwardly bent extension 70 which projects laterally of the pivot 69 in the direction away from the nozzle 64. Movement of the flapper 66 toward the nozzle, i. e., movement about its pivot 69 in a counter-clockwise direction, is produced by a counter-clockwise movement of extension 70 caused by the lowering movement of a pin 71, operatively secured to an arm 72 of a bell-crank movement assembly. The pin 71 extends from a bracket 73 movable along the length of the arm 72 by an adjusting screw 74 associated with the arm and swiveled in the arm for free turning with respect thereto.

The movement assembly, of which arm 72 forms a part, functions responsively both to the position of the valve stem 12 and to a control force in determining the position of the flapper 66. In addition to the arm 72, this assembly includes a cross shaft 76, to which the arm 72 is adjustably secured, and spaced therefrom a long arm 77 also fixedly secured to the cross shaft 76 to form a bellcrank 77, 76, 72. The angular relation of arms 72, 77 of the movement assembly may be adjusted as by the adjusting screw 78 (Figures 3 and 5). Adjusting screw 78 is rotatably carried in a block 78a mounted on an arm 78b rigidly secured to the shaft 76. The free end of adjusting screw 78 is threaded into a block 78c mounted on an arm 89a freely mounted on the shaft 76, but rigidly secured by means of a collar 72a to arm 72. The angular adjustment between arm 72 about the shaft 76 is made by threading the screw 78 into and out of the block 78c to move the arm 89a toward and away from arm 78b. The arrangement is such that the bellcrank movement assembly may turn bodily about the axis of the cross shaft 76; and to this end the cross shaft 76 is journaled for swinging movement in ears 80, 81 which extend from a floating plate 82 forming a part of the hydron assembly to be described.

The free end of the arm 77 of the movement assembly extends forwardly of a slot 85 formed in the back wall of the housing 20, through which extends a rigid arm 86 carried by the valve stem 12 and therefore movable therewith. Arm 77 is arranged above the arm 86, and through a spring 88 operating between a part 89 of the movement assembly and the fixed bracket 67, arm 77 of the movement assembly is yieldingly held against the stem arm 86 and is accordingly positioned in proportional correspondence with the position of the stem 12.

The transversely extending axis of the cross shaft 76, being the axis about which the movement assembly turns, is positionable vertically in accordance with a control force which is preferably provided by a regulated air pressure delivered to the hydron element 90 of a hydron assembly contained within the housing 20. This assembly includes spaced bracket plates 91, 92, bolted to the back wall of the casing, between which extend the corner spacing posts 93. To the lower bracket plate 91 is secured the fixed end plate of the hydron element 90, which is distensible against the force of a spring 94 arranged between the hydron element and the upper bracket plate 92.

A regulated control pressure line 95 delivers to a tube 96 within the housing, the tube in turn delivering air to the interior of the hydron through a suitable opening through the lower bracket plate 91.

The movable end plate of the hydron assembly has associated therewith in such manner as to partake freely of its movement the previously described plate member 82, which extends laterally of the hydron element and is extended upwardly to form the upstanding ear 81, with which ear 80 is associated in generally parallel relation by means of the cross bars 98. Thus, plate 82, ears 81, 80 and cross bars 98 constitute a floating frame structure, in the lower portion of which the cross shaft 76 of the movement assembly is journaled for rotation.

Figure 7:
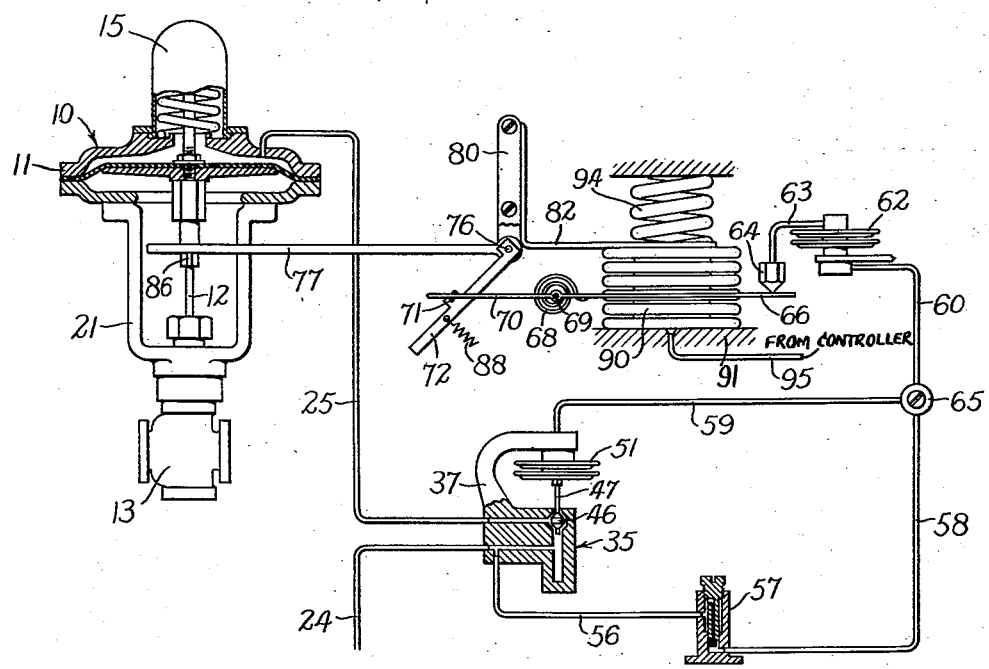
Figure 7 is a diagrammatic view of the line connections.
Figure 8:
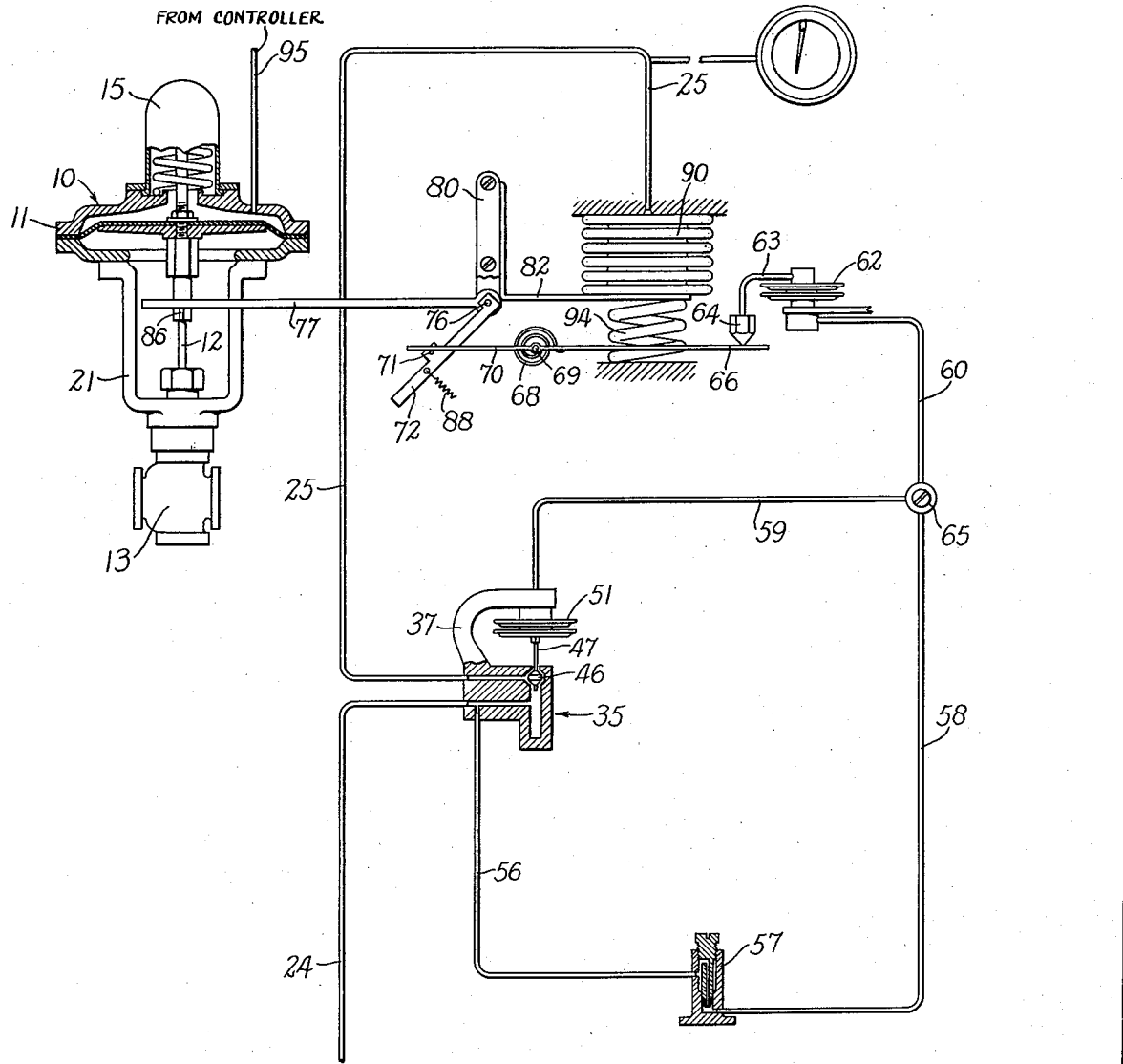
Figure 8 is a diagrammatic view of a line connection showing the apparatus connected up to translate position of the valve into a pneumatic pressure.

Referring to Figure 7, a regulated air pressure delivered to the hydron element 90 causes distension thereof against the force of spring 94, this distension being substantially infinitely proportional to the value of the regulated or control air pressure delivered to the hydron. As the hydron is distended there results a frictionless setting of the hydron end plate and the associated frame assembly, and hence of the axis about which the movement assembly may pivot. Thus, for every value of control air pressure delivered to the hydron element 90, the floating axis of the movement assembly takes up a particular vertical position which is in exact correspondence therewith.

Referring to Figures 3 and 7, if, for example, the pressure in line 95 is increased, the bellows 90 expand to take a position corresponding to the increased pressure in the line 95. This action raises the rack 82 and the shaft 76 which lifts the flapper arm 70 tending to rotate the arm 70 and associated flapper 66 clockwise about the axis 69 and thereby tending to move the flapper away from the nozzle. This tends to decrease the pressure back of the nozzle and in the line 59 and bellows 51 of control head 35 to cause the valve 46 operated by bellows 51 (see Figure 4) to move upward, thereby tending to cause the pressure in line 25 to increase. This increased pressure acts on the diaphragm of the motor 10 to lower the valve stem 12 and move arm 77 and shaft 76 counterclockwise until the rod 71 on the arm 72 has lowered the flapper arm 70 (counterclockwise) and thereby raised the flapper 66 until it is again tangent to the nozzle 64. Because of the friction that usually exists in the valve stem of such a valve motor assembly, there is only approximate correlation between the pressure supplied to the valve motor and the position taken by the valve stem, but sufficient pressure or lack of pressure is always supplied through the control head 35 and the nozzle and flapper to keep the flapper tangent or in operative relation to the nozzle.

The diaphragm motor 10 operates arm 77 and its associated parts to keep the flapper tangent to the nozzle, and thus as the pressure in bellows 90 changes, the lever assembly 77, 76 and 72 is effectively caused to pivot about the point of contact between the arm 72 and the flapper arm 70 as the valve stem 12 follows the movement of the hydron 90. By shifting the point of contact along the flapper arm 70 by means of the adjusting screw 74, the fulcrum is shifted and the mechanical advantage is shifted so that a given movement of the hydron 90 may cause a corresponding movement of the valve stem of a greater or lesser amount.

Thus, in operation, the diaphragm motor is caused to move the valve stem to keep the flapper tangent to the nozzle or at least within the operating range of approximately one thousandth of an inch—and whatever pressure is necessary to move the diaphragm motor to keep the flapper tangent or restore the flapper to tangency is supplied.

The diaphragm 62 supporting the nozzle 64 responds immediately by expanding when the pressure increases and moves the nozzle away from the flapper, which movement decreases the pressure in the bellows 62 to move the nozzle back toward the flapper again. This operation is of sufficiently high frequency so that pressure changes caused by it are not wholly transmitted to the line 60 and to the diaphragm 51 of the control head 35. But the vibrations thus produced are sufficient to keep the parts of the control head in a "nascent condition" so that frictional resistance which may be in the control head does not interfere with the accuracy of the operation of the instrument.

By the above described arrangement it will be seen that the movement assembly herein described functions to correlate stem position with the control pressure according to a fixed relationship. Thus, a particular value of control pressure delivered to the hydron 90 establishes the position of the pivoting axis of the movement assembly. Upon this position being established, air is supplied through the control head to the valve motor at such pressure values as may be necessary to move the stem 12 until its position as measured by the fixed arm 86, and hence the position of the free end of the long arm 77 of the movement assembly, is in the position required by the fixed relationship.

The movement of the valve stem 12 produced by movement of the hydron element 90 may be reversed by reversing the hydron 90 and the spring 94, i. e., by putting the hydron 90 above and the spring 94 below and changing the connection 96 between the line 95 and the hydron 90.

Also, by shifting the line 95 going through the control mechanism to the diaphragm motor around to a coupling 95a in the line 95, and supplying air to the motor 10 from some other source to move the valve stem, the position of the valve stem may be translated into a pressure and the mechanism may be used as a pressure translating mechanism. Under these conditions the source of air supplied to the motor 10 to move it will come from some control instrument of the pneumatic type instead of coming from the control head 35. Thus, for example, the same source of air that was supplied to the hydron 90 under the hook-up shown in Figures 1 and 2 would now go directly to the valve motor 10 instead of to the hydron. When connected up in this manner, the line 25 would lead to a pressure gauge or pressure recorder, which by proper calibration of the pressure would indicate the position of the valve stem 12.

Connected up in this manner, as the stem 12 of the valve motor moves, lever 77 moves with it to correspondingly move arm 72. This changes the nozzle flapper relationship to operate the control head 35 to supply sufficient pressure to the bellows 90 to move the rack 82 and arm 72 to return the flapper to a position tangent to the nozzle. The pressure thus required is proportional to the position of the arm 77 because of the fact that there is no frictional resistance to the movement of the rack 82 and the lever assembly supported by it.

As many changes could be made in carrying out the above constructions, without departing from the scope of the invention, it is intended that all matter contained in the above description or shown in the accompanying drawings shall be interpreted as illustrative and not in a limiting sense.

I claim:

1. In a control mechanism for positioning a movable element, the combination of a pneumatic motor for actuat'ng the element, means for supplying pressure air to the motor at such pressure values as may be necessary to position the element in proportional correspondence with a control force including a control couple of the nozzle and flapper type, angularly related members movable together in response to element position about a common axis which axis is positionable in accordance with the control force, one of the members being adapted to engage the flapper to position the same with reference to the nozzle, and means for adjusting the angular relation of said members.

2. In a control mechanism for positioning a movable element, the combination of a pneumatic motor for actuating the element, means for supplying pressure air to the motor at such pressure values as may be necessary to position the element in proportional correspondence with a control force including a control head of the nozzle and flapper type, a lever assembly movable about a floating axis which axis is positionable in accordance with the control force, the assembly including a plurality of arms, one of the arms adjacent its end portion being arranged in the path of movement of the element, means resiliently urging said arm against the element, another of the arms extending in the path of movement of the flapper, and means resiliently urging said flapper against said other arm with a lesser force than that exerted by the means acting on the first-mentioned arm.

3. In a control mechanism for positioning a movable element, the combination of a pneumatic motor for actuating the element, means for supplying pressure air to the motor at such pressure values as may be necessary to position the element in proportional correspondence with a control force including a control head of the nozzle and flapper type, a lever assembly movable about a floating axis which axis is positionable in accordance with the control force, a member partaking of the movement of the element, the assembly including a plurality of arms, one of the arms adjacent its end portion being arranged in the path of movement of the member, means resiliently urging said arm against the member, another of the arms extending in the path of movement of the flapper, and means resiliently urging said flapper against said arm with a lesser force than that exerted by the means acting on the first-mentioned arm.

4. In a control mechanism for positioning a movable element, the combination of a pneumatic motor for actuating the element, means for supplying pressure air to the motor at such pressure values as may be necessary to position the element in proportional correspondence with a control force including a control valve of the nozzle and flapper type, a lever assembly movable about a floating axis and including an arm positionable in response to element position, and a second arm operative to position the flapper, a hydron, a spring against the force of which the hydron is distensible in proportional correspondence with a predetermined value of control air pressure, and means through which said axis extends providing a fulcrum for the lever assembly, said fulcrum means including a mounting element disposed between the hydron and the spring.

5. In control mechanism for positioning a movable element in accordance with a force value, the combination including a pneumatic motor for actuating the element, a lever assembly pivotally mounted on a floating axis and including an arm movable about said axis by said movable element, an expansible hydron responsive to said force value for frictionlessly positioning said floating axis, a source of air pressure, valve means for controlling the air pressure supplied to said pneumatic motor from said source including a nozzle and an associated flapper which in operative position is tangent to said nozzle, means effectively pivoted about said floating axis and operated by said arm for moving said flapper, and spring means for only lightly urging said flapper toward said last named means and said nozzle whereby said expansible hydron is free to position said floating axis in accordance with the force value and the pneumatic motor is caused to position said movable element in accordance with said force value and to maintain the flapper tangent to the nozzle.

6. In control mechanism for positioning a movable element in accordance with a force value, the combination including a pneumatic motor for actuating the element, a lever assembly pivotally mounted on a floating axis and including an arm movable about said axis by said movable element, an expansible hydron having a free end movable in response to said force value and supporting said floating axis, a source of air pressure, valve means for controlling the air pressure supplied to said pneumatic motor from said source including a nozzle and associated flapper which in operative position is tangent to said nozzle, means effectively pivoted about said floating axis and operated by said arm for moving said flapper, and spring means for only lightly urging said flapper toward said last named means and said nozzle whereby said expansible hydron is free to position said floating axis in accordance with the force value and the pneumatic motor is caused to position said movable element in accordance with said force value and to maintain the flapper tangent to the nozzle, and means for adjusting said means effectively pivoted about said floating axis with respect to said arm to change the relationship of the positions that the movable element is caused to take in accordance with the force values.

7. In control mechanism for positioning a movable element in accordance with a force value, the combination including a pneumatic motor for actuating the element, a lever assembly pivotally mounted on a floating axis and including an arm movable about said axis by said movable element, an expansible hydron having a free end movable in response to said force value and supporting said floating axis, a source of air pressure, valve means for controlling the air pressure supplied to said pneumatic motor from said source including a nozzle and associated flapper which in operative position is tangent to said nozzle, means effectively pivoted about said floating axis and operated by said arm for moving said flapper, and spring means for only lightly urging said flapper toward said last named means and said nozzle whereby said expansible hydron is free to position said floating axis in accordance with the force value and the pneumatic motor is caused to position said movable element in accordance with said force value and to maintain the flapper tangent to the nozzle, and means for changing the effective relationship between said movable element and said lever assembly to change the relationship of the positions that the movable element is caused to take in accordance with the force values.

8. Apparatus for translating the position of a movable element into an elastic fluid pressure comprising, in combination, a source of elastic fluid, an expansible hydron having a free end, means for supplying said elastic fluid to said hydron to maintain said elastic fluid pressure therein and including a pilot valve having a port and a movable restriction thereto, lever means pivotally carried by the free end of said hydron and adapted to operate said movable restriction to control the application of said elastic fluid to said hydron, said lever means having an arm adapted to be operated by said element to pivot said lever, and a light spring urging said arm against said element whereby said movable restriction is operated by the combined action of said hydron and said element.

9. Apparatus for translating the position of a movable element into an elastic fluid pressure comprising, in combination, a source of elastic fluid, an expansible hydron having a free end, means for supplying said elastic fluid to said hydron to maintain said elastic fluid pressure therein, and including a pilot valve including a nozzle and a movable flapper, a control head of the supply and waste valve type operated by pressure varied by said nozzle and flapper, said control head controlling the supply of air to said hydron, lever means carried by said hydron and adapted to operate said flapper, said lever means having an arm adapted to be operated by said element to pivot said lever, and a light spring urging said arm against said element, whereby said movable flapper is operated by the combined action of said hydron and said element.

10. In a control mechanism for positioning a movable element, the combination of a pneumatic motor for actuating said element, means for supplying air pressure to the motor at such pressure values as may be necessary to position the element in proportional correspondence with a control force, said means including a pilot valve of the nozzle and flapper type and a control head of the supply and waste valve type operated by pressure change caused by relative movement of said nozzle and flapper, a hydron having a free end expansible in accordance with said control force, a bearing support carried by the free end of said hydron, and lever means carried by said bearing support, said lever means having an arm adapted to operate said flapper, and having an arm adapted to be operated by said movable element, whereby said flapper is operated by the combined action of said hydron and said movable element.

11. In a control mechanism a first pneumatic motor, a movable element connected to and operated by said first pneumatic motor, a second pneumatic motor having a free end, and extensible in accordance with the pneumatic pressure supplied thereto, a source of air pressure and means for controlling the supply of air to one of said pneumatic motors, said means including a pilot valve of the nozzle and flapper type and a control head of the supply and waste valve type operated by pressure changes caused by change of the relative positions of said nozzle and flapper, a floating bearing support carried by the free end of said second pneumatic motor, lever means mounted in said bearing support and having two arms one of which is movable by said movable element and the other of which is adapted to move said flapper, whereby said flapper is operated by the combined movements of said two pneumatic motors.

CLESSON E. MASON.

CERTIFICATE OF CORRECTION.

Patent No. 2,240,243.

April 29, 1941.

CLESSON E. MASON.

It is hereby certified that error appears in the printed specification of the above numbered patent requiring correction as follows: Page 4, first column, lines 10 and 29, claims 2 and 3 respectively, for the word "head" read --valve--; and that the said Letters Patent should be read with this correction therein that the same may conform to the record of the case in the Patent Office.

Signed and sealed this 25th day of November, A. D. 1941.

(Seal)

Henry Van Arsdale,
Acting Commissioner of Patents.